United States Patent
Simmonds et al.

(10) Patent No.: US 9,664,824 B2
(45) Date of Patent: May 30, 2017

(54) DISPLAY COMPRISING AN OPTICAL WAVEGUIDE AND SWITCHABLE DIFFRACTION GRATINGS AND METHOD OF PRODUCING THE SAME

(71) Applicant: BAE SYSTEMS plc, London (GB)

(72) Inventors: Michael David Simmonds, Rochester-Kent (GB); Mohmed Salim Valera, Rochester-Kent (GB)

(73) Assignee: BAE SYSTEMS plc, London (GB)

(*) Notice: Subject to any disclaimer, the term of this patent is extended or adjusted under 35 U.S.C. 154(b) by 0 days.

(21) Appl. No.: 14/650,682

(22) PCT Filed: Dec. 2, 2013

(86) PCT No.: PCT/GB2013/053184
§ 371 (c)(1),
(2) Date: Jun. 9, 2015

(87) PCT Pub. No.: WO2014/091204
PCT Pub. Date: Jun. 19, 2014

(65) Prior Publication Data
US 2016/0154150 A1    Jun. 2, 2016

(30) Foreign Application Priority Data

Dec. 10, 2012 (GB) .................................. 1222165.1
Feb. 15, 2013 (EP) ...................................... 12275198

(51) Int. Cl.
*G02B 6/00* (2006.01)
*G02B 5/18* (2006.01)
(Continued)

(52) U.S. Cl.
CPC ......... *G02B 5/1828* (2013.01); *G02B 5/1823* (2013.01); *G02B 5/1842* (2013.01);
(Continued)

(58) Field of Classification Search
CPC ...................................................... G02B 27/42
(Continued)

(56) References Cited

U.S. PATENT DOCUMENTS 4,973,127 A * 11/1990 Cannon et al. ................. 385/56
7,004,639 B2 * 2/2006 Norland ........................... 385/53
(Continued)

FOREIGN PATENT DOCUMENTS

WO    2014091204 A1    6/2014

OTHER PUBLICATIONS

International Preliminary Report on Patentability and Written Opinion received for Patent Application No. PCT/GB2013/053184, mailed on Jun. 25, 2015. 8 pages.
(Continued)

*Primary Examiner* — Kaveh C Kianni
(74) *Attorney, Agent, or Firm* — Finch & Maloney PLLC (57) ABSTRACT

An apparatus is disclosed for producing an optical display comprising an optical waveguide (1) and a pair (10, 16) of switchable diffraction gratings that are switchable between a diffractive state and a non-diffractive state. A pair of non-switchable diffraction gratings (2, 14) is arranged to receive diffract light from one switchable grating for guided propagation along the optical waveguide and out to the other switchable grating for viewing. The pair of non-switchable gratings are tuned to a first operating wavelength of light, while the pair of switchable gratings are tuned to a different operating wavelength of light to diffract that light into/from a field of view in common with that of the non-switchable gratings such that light of two wavelengths occupies the same field of view.

17 Claims, 8 Drawing Sheets

(51) Int. Cl.
 *G02F 1/295* (2006.01)
 *G02F 1/313* (2006.01)
 *F21V 8/00* (2006.01)
 *G02B 27/42* (2006.01)

(52) U.S. Cl.
 CPC .......... *G02B 5/1866* (2013.01); *G02B 6/005* (2013.01); *G02B 6/0026* (2013.01); *G02B 27/4211* (2013.01); *G02B 27/4272* (2013.01); *G02F 1/295* (2013.01); *G02F 1/313* (2013.01); *G02F 2201/305* (2013.01); *G02F 2203/34* (2013.01)

(58) Field of Classification Search
 USPC .......................................................... 385/37
 See application file for complete search history.

(56) References Cited

U.S. PATENT DOCUMENTS

| | | | |
|---|---|---|---|
| 8,233,204 B1 * | 7/2012 | Robbins et al. | 359/15 |
| 2007/0052929 A1 | 3/2007 | Allman et al. | |
| 2011/0280573 A1 * | 11/2011 | Collings et al. | 398/48 |
| 2012/0218481 A1 * | 8/2012 | Popovich et al. | 349/11 |
| 2013/0101253 A1 * | 4/2013 | Popovich et al. | 385/37 |
| 2014/0104665 A1 * | 4/2014 | Popovich et al. | 359/15 |
| 2014/0140653 A1 * | 5/2014 | Brown et al. | 385/10 |
| 2014/0140654 A1 * | 5/2014 | Brown et al. | 385/10 |
| 2014/0204455 A1 * | 7/2014 | Popovich et al. | 359/316 |
| 2015/0289762 A1 * | 10/2015 | Popovich et al. | 359/316 |

OTHER PUBLICATIONS

International Search Report and Written Opinion received for Patent Application No. PCT/GB2013/053184, mailed on Feb. 28, 2014. 10 pages.
GB Intellectual Property Office Search Report under Section 17(5) received for GB Patent Application No. 1222165.1, mailed Apr. 11, 2013. 3 pages.
Extended European Search Report received for EP Patent Application No. 12275198.5, mailed Aug. 9, 2013. 7 pages.
D'Alessandro, A. et al., "Electro-Optic Properties of Switchable Gratings Made of Polymer and Nematic Liquid-Crystal Slices", Optics Letters, Jun. 15, 2004, pp. 1405-1407, vol. 29, No. 12.

* cited by examiner

DISPLAY COMPRISING AN OPTICAL WAVEGUIDE AND SWITCHABLE DIFFRACTION GRATINGS AND METHOD OF PRODUCING THE SAME

The invention relates to a method and apparatus for providing an optical display such as, but without limitation to, an optical display employing an optical waveguide. In particular, the invention is relevant to a display device in which image-bearing light is injected into the waveguide and is subsequently released from the waveguide for viewing.

Optical waveguides for display devices of this type typically present a field of view (FOV) which is dictated by, and limited according to, the ability of the waveguide to retain light injected into it for propagation along the waveguide by total internal reflection (TIR). If light is injected into the waveguide outside of a particular angular range, then it cannot be retained by TIR for propagation along the waveguide and will simply exit the waveguide with out propagating along it.

Figure 1A:
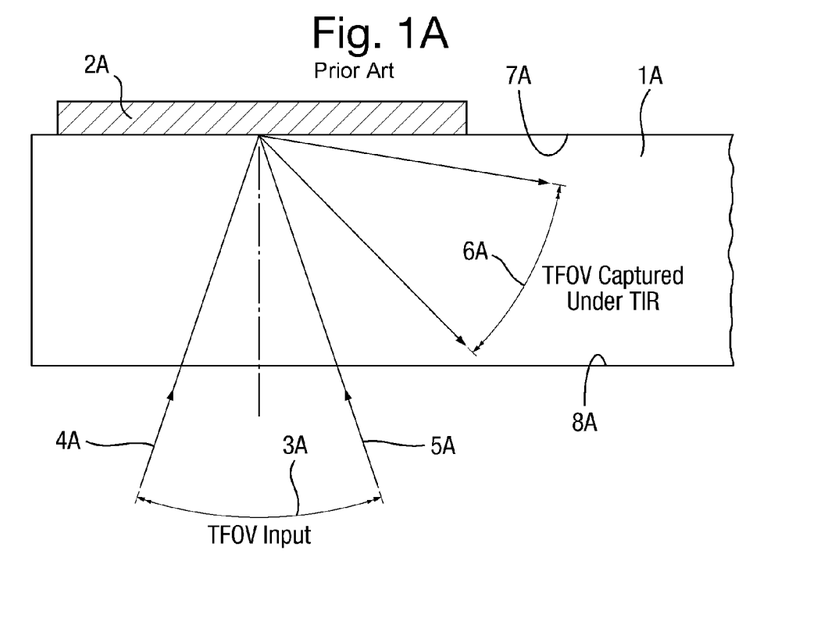
FIGS. 1A, 1B and 1C each schematically illustrate a cross-sectional view of the input end of an optical waveguide such as a slab optical waveguide, with the input of light of a wavelength (FIG. 1A) of a first wavelength (e.g. green light), with the input of light of a wavelength (FIG. 1B) of a second wavelength (e.g. blue light), and with the input of light of a wavelength (FIG. 1C) of a third wavelength (e.g. red light)

FIG. 1A shows schematically an example of a prior art optical waveguide display (1A) upon any rear surface of which is arrange a Bragg grating (2A) arranged to receive light (3A) input through an opposite surface of the waveguide so as to be incident upon a facing surface of the Bragg grating. The structure of the Bragg grating (e.g. grating constant) is such that the received light is diffracted into a diffraction order (usually the first order) to redirect the input light into light (6A) for propagation along the body of the waveguide internally by TIR between opposing internal surfaces (7A, 8A). Only the input end of the waveguide is shown. The refractive index of the material of the optical waveguide (1A) determines the angle of incidence of the diffracted light (6A) which will result in TIR, such that an angle of incidence of light (6A) within the optical waveguide when impinging upon an internal surface (7A, 8A) which is not within the permitted range will not be totally internally reflected. This angular limitation for TIR within the waveguide is in respect of a particular first wavelength of light to which the structure of the Bragg grating is tuned. It presents itself as an angular limitation in the total field of view (TFOV) of input light (3A) of that particular wavelength, such as green light. Extreme angular positions of the TFOV are indicated in FIG. 1 (4A and 5A).

Figure 1B:
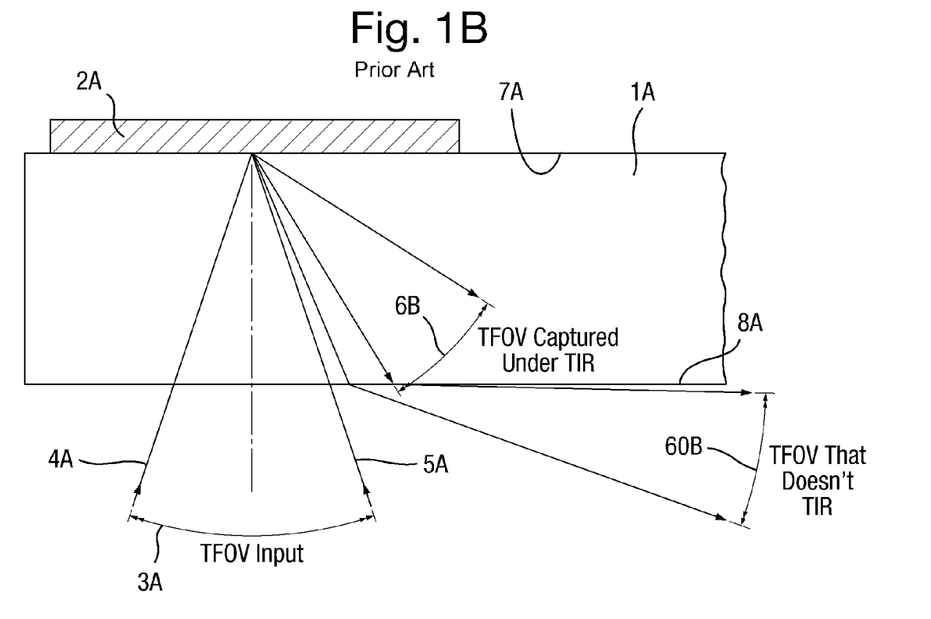

FIG. 1B shows the result of inputting light of a second wavelength (e.g. red light) which is longer than that of the light to which the Bragg grating is tuned. The Bragg grating diffracts the light of longer wavelength to an angle different to that which it diffracts light for which it is tunes (FIG. 1A). The result is that some of the light of the second wavelength entering the apparatus at and close to one of the extreme angular positions (4A) is subsequently diffracted by the Bragg grating to an angle within the waveguide (1A) which will not allow TIR of that light. Consequently, some of the input light will simply escape (60B) the waveguide. This reduces the field of view of the waveguide in respect of light having the second wavelength, as compared to the field of view in respect of light of the first wavelength.

Figure 1C:
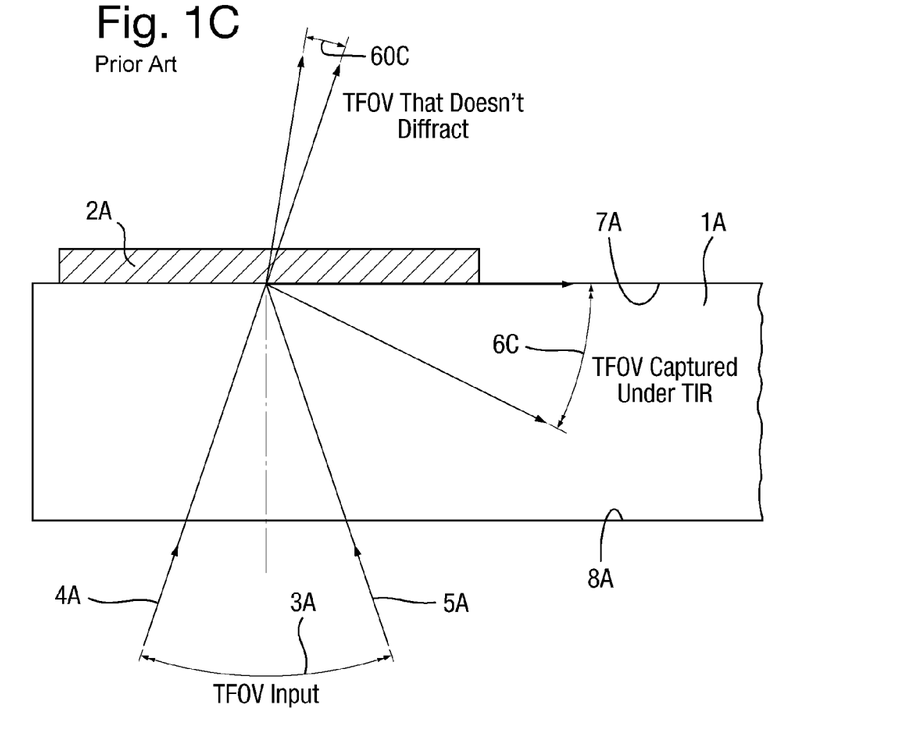

FIG. 1C shows the result of inputting light of a third wavelength (e.g. blue light) which is shorter than that of the light to which the Bragg grating is tuned. The Bragg grating diffracts the light of shorter wavelength to an angle different to that which it diffracts light for which it is tunes (FIG. 1A). The result is that some of the light of the third wavelength entering the apparatus at and close to one of the extreme angular positions (5A) is subsequently diffracted by the Bragg grating to an angle within the waveguide (1A) which will not allow TIR of that light. Consequently, some of the input light will simply escape (60C) the waveguide. This reduces the field of view of the waveguide in respect of light having the third wavelength, as compared to the field of view in respect of light of the first wavelength.

This total field of view of the input light into the waveguide of the display apparatus, at different colours of light, is a significant limitation.

The invention aims to address this limitation.

At its most general, the invention is to control the wavelength dependence of the field of view of a waveguide optical display apparatus, for a display device, that has an input diffractive part for diffracting received light of a first wavelength for propagation along the optical waveguide within the input field of view of the apparatus defined by the limits of total internal reflection (TIR) of the waveguide. This is done by employing an additional diffractive part (or a plurality of them) before the input diffractive part that is arranged to receive light of a second wavelength from outside the input field of view in respect of the first wavelength, and to re-direct that light to the input diffractive part to an angle which will result in TIR of that light by the waveguide when it is diffracted by the input diffractive part for propagation along the optical waveguide. Thus, light of the second wavelength from outside the field of view of the apparatus can be captured and directed into the input field of view by the additional diffractive part(s). Multiple such additional diffractive parts may be used to capture incoming light for multiple different additional/extra wavelengths to extend the colour range within the field of view of the apparatus.

In a first aspect, the invention may provide an apparatus for producing an optical display comprising: an optical waveguide; a first switchable diffractive part switchable between a diffractive state for diffracting light of a first wavelength and a non-diffractive state, and arranged to receive light and selectively to diffract the light to a second diffractive part; said second diffractive part is arranged to receive from the first switchable diffractive part diffracted light of said first wavelength and non-diffracted light of a second wavelength other than the first wavelength and to diffract said light of either wavelength to a common angle for guided propagation along the optical waveguide; a third diffractive part optically coupled to the second diffractive part by the optical waveguide and arranged to receive and to diffract light of said first wavelength from the second diffractive part to a first angle for output from the optical waveguide and to receive and to diffract light of said second wavelength from the second diffractive part to a second angle for output from the optical waveguide; a fourth switchable diffractive part switchable between a diffractive state for diffracting light of a first wavelength and a non-diffractive state, and arranged to receive and selectively to diffract said light from the third diffractive part into a common angle such that light of the first and second wavelengths occupy the same field of view.

The apparatus may include a fifth switchable diffractive part switchable between a diffractive state for diffracting light of a third wavelength and a non-diffractive state, and arranged to receive light and selectively to diffract the light to a second diffractive part. The second diffractive part is preferably arranged to receive from the first switchable diffractive part diffracted light of said third wavelength and non-diffracted light of said second wavelength other than the third wavelength and to diffract said light of either wavelength to a common angle for guided propagation along the optical waveguide.

The third diffractive part may be arranged to receive and to diffract light of said third wavelength from the second diffractive part to a third angle for output from the optical waveguide and to receive and to diffract light of said second wavelength from the second diffractive part to said second angle for output from the optical waveguide, the apparatus including and a sixth switchable diffractive part switchable between a diffractive state for diffracting light of the third wavelength and a non-diffractive state, and arranged to receive light and selectively to diffract the light from the third diffractive part into a common angle such that light of the second and third wavelengths occupy the same field of view.

One, some or each of said switchable diffractive parts may be formed within or upon an optical substrate separate from said optical waveguide. The switchable diffractive parts are preferably electrically switchable between their diffractive and non-diffractive states, and may be of a known type such as is readily apparent and available to the skilled person. Examples are given below. The separate optical substrate may be separated and/or separable from the optical waveguide, and may be attached to or positioned adjacent to the waveguide to place the first, fourth, (and optionally fifth and sixth, when present) switchable diffractive parts in register with the second and third diffractive parts of the waveguide, as appropriate. In this way, existing, legacy optical waveguide display units, comprising the second and third diffractive parts, may be modified by combining them with the separate optical substrate containing the first, fourth, (and optionally fifth and sixth, when present) switchable diffractive parts. One, some or each of the switchable diffractive parts may be formed within or upon the optical waveguide. In this alternative, the switchable and non-switchable diffractive parts may be inseparable parts of one optical unit. By preferably using non-switchable second and third diffractive parts, one reduces the cost of manufacture of the apparatus and also the possible modes for failure (e.g. switching failure) by reducing the number of switchable diffractive parts.

The first switchable diffractive part may at least partially overlap the fifth switchable diffractive part. The fourth switchable diffractive part may at least partially overlap the sixth switchable diffractive part.

The apparatus may include control means arranged to control the first switchable diffractive part and the fourth diffractive part selectively to adopt the same one of said diffractive state and a non-diffractive state concurrently. Thus, the two may act in tandem.

The apparatus may include control means arranged to control the fifth switchable diffractive part and the sixth diffractive part selectively to adopt the same one of said diffractive state and a non-diffractive state concurrently. Thus, the two may act in tandem.

The control means may be arranged to control the fifth switchable diffractive part and the sixth switchable diffractive part selectively to each adopt concurrently the same one of said diffractive state and a non-diffractive state and to control concurrently the first switchable diffractive part and the fourth switchable diffractive part selectively to each adopt concurrently the same other one of said diffractive state and a non-diffractive state. Thus, one pair preferably act when the other pair does not. The control means is preferably arranged to alternately switch said switchable diffractive parts between said diffractive state and a non-diffractive state cyclically.

The control means may be arranged to switch said switchable diffractive parts cyclically including a condition such that all adopt a non-diffractive state concurrently.

The apparatus may comprise a light source arranged to generate light according to said first, second and third wavelengths.

Preferably, a switchable diffractive part is switchable to comprise a diffraction grating with a grating constant ($d_{sg}$) arranged to diffract the light of a first (or third) wavelength ($\lambda_i$, i=1, 3) received thereby into the angular field of view of the second diffractive part in respect of light of a second wavelength ($\lambda_2$) wherein the second diffractive part has a grating constant ($d_{wg}$), and:

$$d_{sg} = \frac{\lambda_i d_{wg}}{\lambda_i - \lambda_2}.$$

Preferably, a switchable diffractive part is switchable to comprise a diffraction grating with a grating constant ($d_{sg}$) arranged to diffract the light of a first (or third) wavelength ($\lambda_i$, i=1, 3) received thereby within the angular field of view of the third diffractive part in respect of light of a second wavelength ($\lambda_2$) wherein the second diffractive part has a grating constant ($d_{wg}$), and:

$$d_{sg} = \frac{\lambda_i d_{wg}}{\lambda_i - \lambda_2}.$$

In a second aspect, the invention may provide a method for producing an optical display comprising: providing an optical waveguide; providing a first switchable diffractive part switchable between a diffractive state for diffracting light of a first wavelength and a non-diffractive state, and receiving light and selectively diffracting the light to a second diffractive part; at said second diffractive part, receiving from the first switchable diffractive part diffracted light of said first wavelength and non-diffracted light of a second wavelength other than the first wavelength and diffracting said light of either wavelength to a common angle for guided propagation along the optical waveguide; providing a third diffractive part optically coupled to the second diffractive part by the optical waveguide and therewith receiving and diffracting light of said first wavelength from the second diffractive part to a first angle for output from the optical waveguide and receiving and diffracting light of said second wavelength from the second diffractive part to a second angle for output from the optical waveguide; providing a fourth switchable diffractive part switchable between a diffractive state for diffracting light of a first wavelength and a non-diffractive state, and therewith receiving and selectively diffracting said light from the third diffractive part into a common angle such that light of the first and second wavelengths occupy the same field of view.

One, some or each of the diffractive parts may comprise a Bragg grating. The first and fourth switchable diffractive parts may be mutually conjugated. The second and third switchable diffractive parts may be mutually conjugated. That is to say, the order into which the fourth switchable diffractive part diffracts light may be opposite to the order into which the first switchable diffractive part diffracts that light before it was received by the fourth switchable diffractive part. The fifth and sixth switchable diffractive parts may be mutually conjugated. The second and third diffractive parts may be mutually conjugated. In this way, input and output diffractive parts may be conjugated in pairs.

Benefits of such conjugation include a reduction in geometric distortions imposed on image-bearing light by diffraction occurring at the first diffractive grating region. The preferable conjugation of the fourth switchable diffractive part has the effect of, to some extent, imposing geometric distortions in an opposite sense which serve to at least partly reversing the distortions imposed by the first switchable diffractive part. This also applies to the other conjugated pairs of diffractive parts. Chromatic dispersion is also very considerably reduced as a result of conjugation, and in practice is effectively substantially negated/removed. This is especially beneficial when a broadband optical source, such as an LED light source, is employed to generate the light input to the waveguide. As can be seen from the well-known "grating equation" in which the angle of diffraction of light, into a given order of diffraction, is dependent upon the wavelength of that light. A diffracted beam from a broadband optical source may comprise an angular split/dispersion into constituent colours (a rainbow of colours)—particularly undesirable in image-bearing light. Longer wavelengths of light are deviated most by the diffraction into a given non-zero order, and shorter wavelengths less.

Any one, some or all of the switchable diffractive parts may be either optically transmissive or optically reflective.

There now follows a description of an exemplary, but non-limiting, embodiment of the invention for the purposes of illustration with reference to the accompanying drawings of which.

In the drawings like articles are assigned like reference symbols.

Figure 2A:
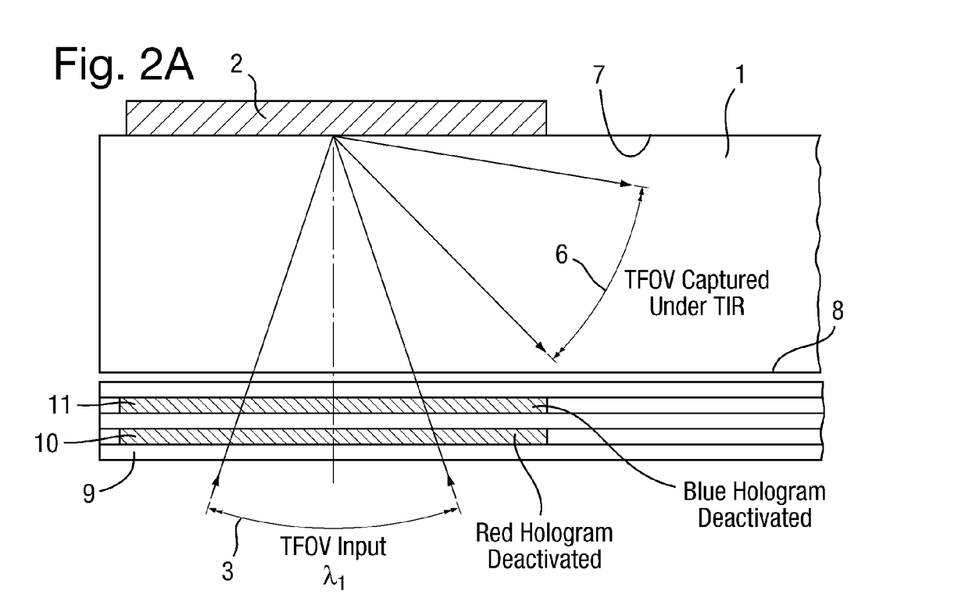
FIGS. 2A, 2B and 2C each schematically illustrate a cross-sectional view of the input end of a slab optical waveguide according to an embodiment of the invention, with the input of light of a wavelength (FIG. 2A) of a first wavelength (e.g. red light), with the input of light of a wavelength (FIG. 2B) of a second wavelength (e.g. blue light), and with the input of light of a wavelength (FIG. 2C) of a third wavelength (e.g. green light)
Figure 2B:
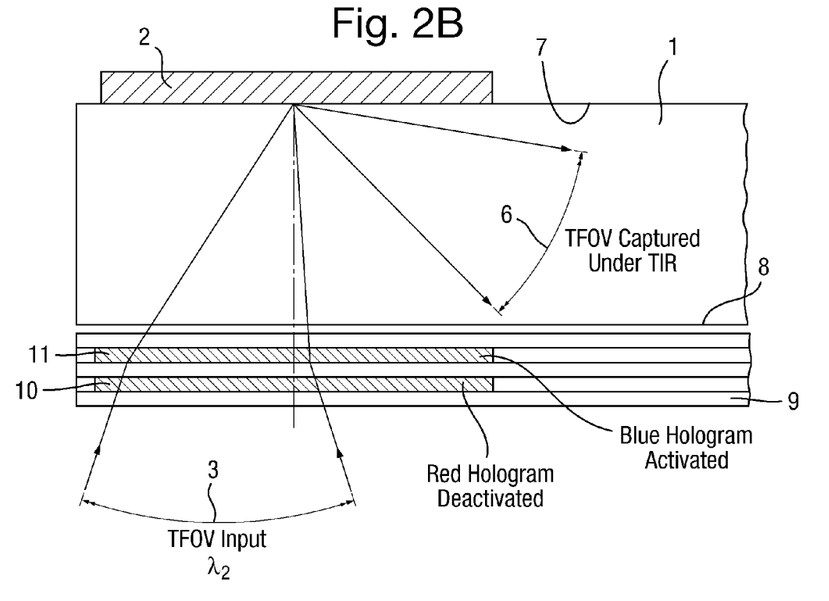
Figure 2C:
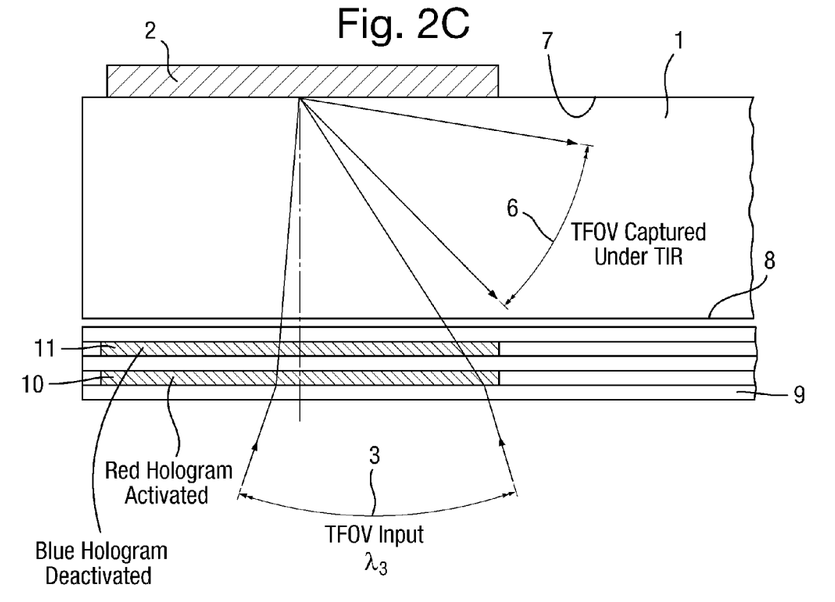

FIGS. 2A, 2B and 2C schematically illustrate a cross-sectional view of the in put end of a slab waveguide for a display apparatus according to a preferred embodiment of the invention. The input end illustrated in FIGS. 2A-2C is shown as part of the complete optical waveguide apparatus illustrated schematically in FIG. 3.

The apparatus includes an optical waveguide (1) in the form of a slab waveguide upon a rear surface of which is formed a Bragg grating (2) arranged and tuned for diffracting light of a first wavelength input to the optical waveguide via an opposing surface (8) of the slab waveguide. The diffractive grating structure of the Bragg grating (2) is arranged such that input light (3) of a first wavelength (e.g. green light) impinging upon the diffractive surface of the Bragg grating is diffracted into a first diffraction order (6) for propagation along the waveguide by total internal reflection (TIR). The angle at which input light is diffracted is determined also by the angle at which it is incident upon the diffractive grating surface of the Bragg grating (2). There exists a range of input angles which result in diffraction of input light, of the first wavelength, into an angle suitable for and capable of being captured within the slab waveguide by total internal reflection (6). This range of extreme input angles defines the total field of view (TFOV) of the input light (3) of the system. Propagation of the captured light (6) within the slab waveguide is supported by successive total internal reflections of the captured light between opposing internal slab surfaces (7, 8).

A spectrum expander (9), is arranged in front of the optical input surface (8) of the slab waveguide and comprises a first switchable transmissive diffraction grating (10) fully overlapping and in register with a second and subsequent switchable transmissive diffraction grating (11). Both the first switchable grating (10) and the second switchable grating (11) are of the same size as each other and the same size as the input Bragg grating (2) arranged at the opposite face/side of the slab waveguide. All three diffractive grating structures are arranged in register and in parallel.

Each of the first and second switchable diffraction gratings (10, 11) is electrically switchable between a diffractive state arranged to diffract incoming light (3) and a non-diffractive state in which light received thereby is not diffracted. Both gratings are transmissive.

FIG. 2A illustrates the situation in which both of the first and second switchable diffraction gratings are deactivated and are purely transmissive, and non-diffractive, and in which light of the first wavelength is input. Consequently, the total field of view (TFOV) in the state illustrated in FIG. 2A corresponds to the total field of view (TFOV) were the spectral expander (9) not present.

A preferred way in which to implement the switchable diffraction gratings, in preferred embodiments of the invention, is described by: Alessandro et al published in OPTICS LETTERS, 15 Jun. 2004, Vol. 29, no. 12, pages 1405-1407. Another preferred way is disclosed in: DigiLens® Light Emitting Diode Condenser (D-LEDC) for Next Generation Digital Projection: White Paper; which is available at: http://www.digilens.com/white/DigiLens%20-%203D%20Passive%20LED%20PicoProjector%20-%20White%20Paper.pdf, or is available from SBG Labs Inc, 1288 of Hammerwood Avenue, Sunnyvale, Calif. 94089, USA.

FIG. 2B schematically illustrates the state of the apparatus illustrated in FIG. 2A in the alternative situation in which light of a second wavelength (e.g. blue light) shorter than that of the first wavelength is input. Only the first switchable diffraction grating (10) remains deactivated, whereas the second switchable diffraction grating (11) between the first switchable diffraction grating and the input diffraction grating (2), is in the activated state and has become diffractive. In this diffractive state, it is only light with a second wavelength (e.g. blue light) when input into the second switchable diffraction grating (11) which will subsequently be diffracted by the second switchable diffraction grating to an angle towards the input diffraction grating (2) which results in diffraction of that light by the input diffraction grating into the same captured total field of view (6) within which internal propagation along the slab waveguide is permitted. In this way, while the second switchable diffraction grating remains activated, and the first switchable diffraction grating remains deactivated, the slab waveguide is able to capture and propagate input light of the second wavelength within the angular total field of view (6) associated with light of the first wavelength (3). The light of the second wavelength would otherwise not all be captured into the angular total field of view were both of the first and second switchable diffraction gratings deactivated. The second switchable diffraction grating (11) is arranged (e.g. grating constant) to direct light of the second wavelength to an angle towards the input diffraction that allows the input diffraction grating to subsequently diffract that light into the same total field of view for capture by TIR within the waveguide as is the case with light of the first wavelength. Thus, the light of a different colour is re-directed to the input grating (2) at a different incidence angle that depends upon the wavelength of that light and upon the properties of the input grating (e.g. grating constant). The input grating responds by diffracting the re-directed light into the desired total field of view for capture by TIR within the waveguide such that the field of view of the different colour (e.g. blue) is the same as that of the other colour (e.g. green) otherwise used.

FIG. 2C schematically illustrates a similar circumstance in which light of a third wavelength (e.g. red light) longer than that of the first wavelength is input. Only the first switchable diffraction grating (10) is activated, whereas the second switchable diffraction grating (11) is deactivated. Similarly, activation of the first switchable diffraction grating (10) in this way, results in the capture of input light of the third wavelength incident upon the spectrum expander (9). This light, when incident upon the first switchable diffraction grating, when activated, within the same total field of view (3) as that of light of the first wavelength, is diffracted by the first switchable diffraction grating into an angle of incidence upon the input diffraction grating (2) which subsequently results in diffraction of that input light into the captured total field of view (6) of the optical slab waveguide. The light is therefore captured by the optical slab waveguide for propagation along it. Consequently, light of a third wavelength, which is different to the first and second wavelengths, is captured within the total field of view for capture by TIR within the waveguide.

By appropriately selecting the activation state of the first and second switchable diffraction gratings (10,11) to be such that one is activated, but not the other, or such that both are deactivated, it is possible to access all three of the wavelengths (colours) of light selectively. In this sense, the spectrum expander (9) expands the spectrum of the apparatus as a whole by virtue of accessing the second and third (12,13) wavelengths of light within the sane total field of view as the first wavelength of light, by appropriate activation/deactivation of the first and second switchable diffraction gratings as described.

Figure 3:
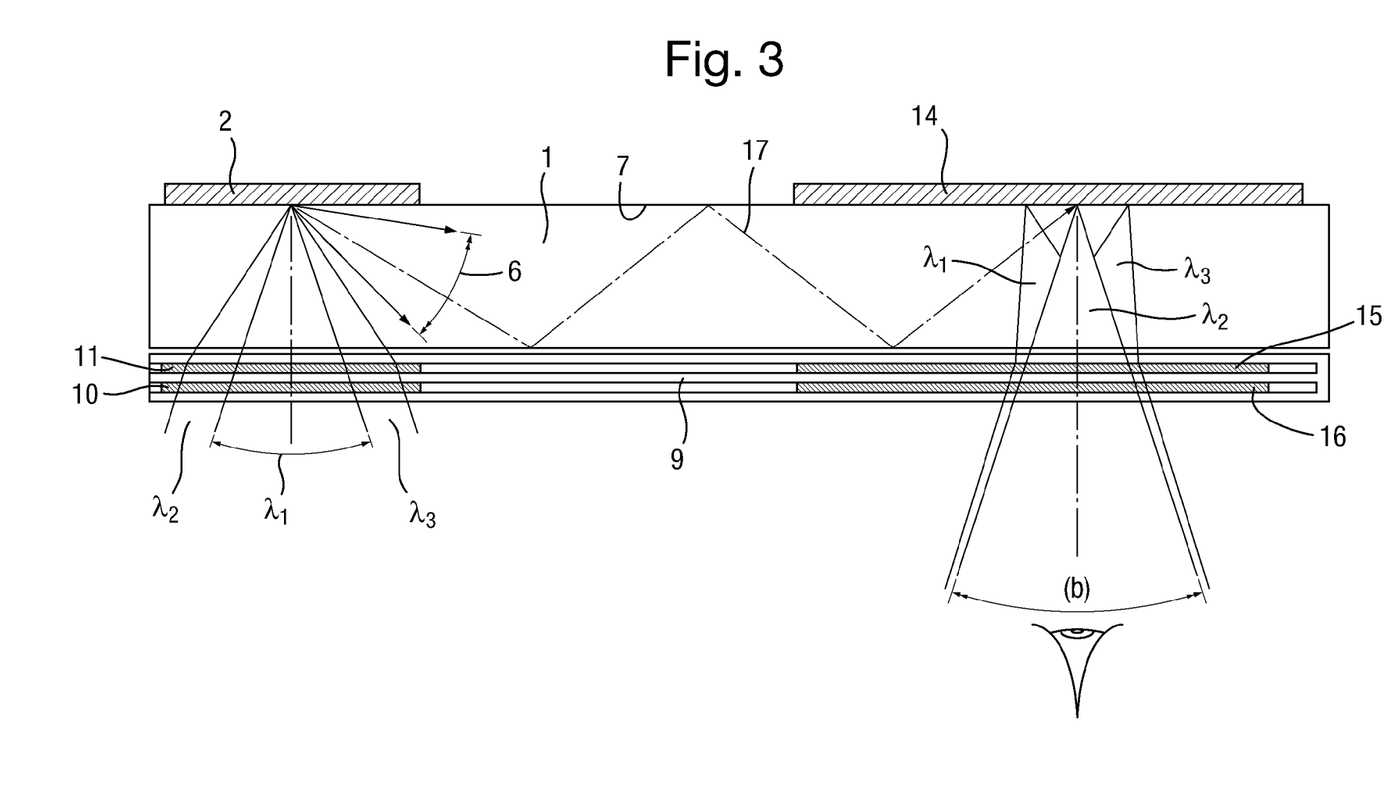
FIG. 3 schematically illustrates a slab waveguide incorporating the input end illustrated in FIGS. 2A to 2C, and showing the output end of the slab waveguide.

FIG. 3 schematically illustrates the waveguide apparatus comprising the optical slab waveguide and field of view expander in full, shown in cross-section. The left-hand half of the schematic illustrated in FIG. 3 corresponds to the representations illustrated in FIGS. 2A to 2C described above.

The waveguide apparatus includes an output diffraction grating (14) comprising a Bragg grating arranged upon the same outer slab surface is that upon which the input grating (2) is arranged. The output grating is so arranged as to receive guided light (17) emanating from the input grating towards the output grating along the body of the slab waveguide internally, by a sequence of TIR events. The output grating has a grating constant and grating structure designed to diffract such received light to an angle for output from the slab waveguide within an angular range, which varies according to the wavelength of the light, for viewing by a viewer. This variation in output viewing angle is compensated for by a third and fourth switchable diffraction gratings as follows.

A third (15) and fourth (16) independently electrically switchable, transmissive diffraction gratings are arranged within the body of the spectrum expander (9) in parallel and fully in register with each other and with the output grating (14). Each of the third and fourth switchable diffraction gratings is switchable selectively between a diffractive state in which the grating is arranged to diffract light received from the output grating, and a non-diffractive state in which the grating simply allows the light to pass un-diffracted.

When both of the third and fourth switchable diffraction gratings are switched into the de-activated, non-diffractive state, the light of the first wavelength within the output angular range (b) that is received by the spectrum expander (9) from the output grating (14), passes through the spectrum expander with substantially no deviation. However, when the fourth switchable diffraction grating is activated to the diffractive state, the light of the third wavelength (e.g. blue light) received thereby from the output grating is diffracted into a new angular range coincident with the angular range (b) associated with light of the first wavelength. Similarly, when the third switchable diffraction grating is activated to the diffractive state, the light of the second wavelength (e.g. red light) received thereby from the output grating is diffracted into a new angular range also coincident with the angular range (b) associated with light of the first wavelength.

In this way, light of three different wavelengths (e.g. red, green and blue light) input into the captured TFOV (6) of the optical slab waveguide via the first and second switchable gratings (10,11) and the input grating (2) of the waveguide apparatus, may be selectively output to the same one angular viewing range (b) by appropriately controlling the switching of all four switchable diffraction gratings, collectively. Consequently, the spectrum comprising three different wavelengths of light associated, respectively, with: activation of the first switchable diffraction grating (11) alone; with deactivation of both of the first and second switchable diffraction gratings (11, 12) concurrently; or with activation of the second switchable diffraction grating (11) alone, can be viewed in an expanded output (i.e. viewing) field of view by: activation of the third switchable diffraction grating (11) alone; with deactivation of both of the third and fourth switchable diffraction gratings (11, 12) concurrently; or with activation of the fourth switchable diffraction grating (11) alone.

For example, if the first switchable diffraction grating (10) is activated in order to capture the input of the second wavelength, then the fourth (16) switchable may be concurrently activated to output that captured field into the angular range (b) for the viewer. Both of the second and third switchable gratings would be deactivated at that time. Subsequently, or alternatively, if the second switchable diffraction grating (11) is activated in order to capture the light of the third wavelength, then the third (15) switchable may be concurrently activated to output that captured light into the angular range (b) for the viewer. Both of the first and fourth switchable gratings would be deactivated at that time. Subsequently, or alternatively, each of the switchable diffraction gratings may be de-activated in order to capture the input light of the first wavelength and to output that captured field into the angular range (b) for the viewer. The expanded spectrum of light within the common field of view (first+second+third wavelengths) may thus be captured, as sequentially captured wavelengths of light, and output for viewing by a viewer as spectrally expanded common output filed of view (b).

Figure 4:
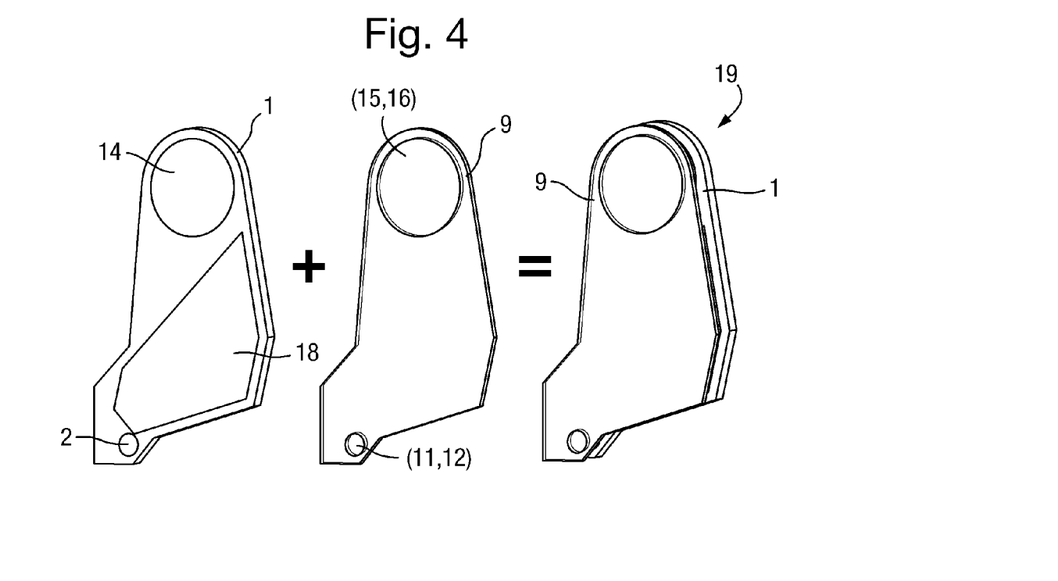
FIG. 4 schematically illustrates a combination of a slab waveguide together with a spectrum expander apparatus in order to provide an apparatus of the type illustrated in FIG. 3.

FIG. 4 illustrates a slab optical waveguide (1) for a display device combined with a spectrum expander (9) in order to provide an apparatus according to the schematic drawing of FIG. 3. In this display device the slab waveguide contains three separate areas of the diffraction grating perform a respective one of three successive functions. A first diffractive area (2) serves as a light input grating for diffracting received light along the slab waveguide. A second and intermediate diffractive area (18—not shown in FIG. 5) serves to expand the light from the first area in a first dimension, and a third diffractive area serves as the output grating arranged to receive the expanded light and further expand the light in a second dimension orthogonal to the first dimension and to output the result from the waveguide. In particular, the input diffraction grating region (2) is arranged for receiving image-bearing light and for injecting that light into the waveguide (1) by diffraction. This injected light is guided to the intermediate diffractive region (18) where the light is laterally expanded and subsequently guided to the output diffractive region (14) where it is transversely expanded across the output grating to form a visible image which is released from the waveguide for viewing. The input grating and output grating are fixed and non-switchable. The total field of view (TFOV) of the optical waveguide in isolation is fixed.

A spectrum expander (9) is provided, having a first and second switchable diffraction gratings (11, 12) matching the shape, size and dimensions of the input grating and a third and fourth switchable diffraction gratings matching the shape, size and dimensions of the output grating. Both are formed within and support body (9) which holds the switchable gratings in mutually parallel orientations and at relative positions such that the first and second switchable gratings can be placed in register in front of the input grating (2) of the slab waveguide while simultaneously positioning the third and fourth switchable gratings in register with the output grating (14). This is shown in FIG. 6 and results in the apparatus shown in cross-section in FIG. 3.

Figure 5:
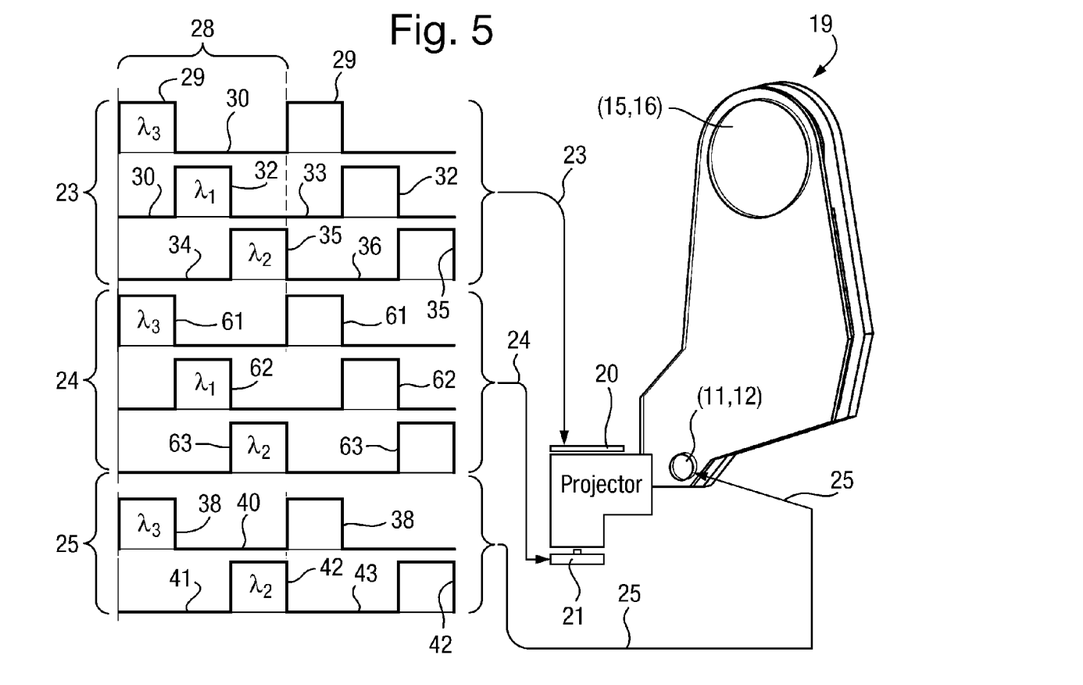
FIG. 5 schematically illustrates a sequence of control signals for input to a display apparatus according to an embodiment of the invention.

FIG. 5 illustrates a display apparatus according to an embodiment of the invention which includes the optical waveguide display and the spectrum expander of FIG. 3 and FIG. 4. The display apparatus also includes an image projector (20) unit including an image display panel, such as an LCD display panel and an illumination light source (21) such as an LED array for illuminating the display panel selectively with light of the first wavelength, the second wavelength or the third wavelength. The projector unit, which may be of known type such as would be readily available to the skilled person, comprises optical elements arranged to project the illuminated image generated upon the LCD display screen (20) out of the projector unit for inputting light into the first and second co-registered switchable diffraction gratings (10, 11). The control unit (100) is arranged to control the first switchable diffraction grating (11) and the third switchable diffraction grating (15) selectively to adopt the same one of either a diffractive state or a non-diffractive state concurrently. The result is to access selectively the expanded spectrum comprising light of the second wavelength.

The control unit (100) is also arranged to control the second switchable diffraction grating (11) and the fourth switchable diffraction grating (16) selectively to adopt the same one of either a diffractive state or a non-diffractive state concurrently. The result is to access selectively the expanded spectrum comprising light of the third wavelength. Furthermore, the control means is arranged to switch all switchable diffraction gratings cyclically in this way and including a condition such that all adopt a non-diffractive state concurrently—thereby accessing selectively the spectrum comprising light of the first wavelength.

The control unit is arranged to control the first and third switchable diffraction gratings selectively to each adopt concurrently the same one of a diffractive state and a non-diffractive state and to control concurrently the second switchable diffraction grating and the fourth switchable diffraction grating selectively to each adopt concurrently the same other one of the diffractive state and a non-diffractive state. In this way, different wavelengths of light can be accessed by a coordinated switching of the four switchable diffraction gratings. The control unit is arranged to alternately switch the switchable gratings between these diffractive state and a non-diffractive state cyclically, as is shown schematically in FIG. 5.

The control unit generates three sets of control signals in use. A first set (23) is input by the control unit into the projector unit and is arranged to control operation of the image display screen (20) of the projector unit. A second set (24) is input by the control unit into the projector unit and is arranged to control operation of the LED array (21) arranged to selectively emit light of any one of the first, second and thirds wavelengths. The LED array includes at least three separate LEDs dedicated to generating light in a respective one of these three wavelengths (e.g. red, green and blue). A third set (25) is input by the control unit into the spectrum expander (9) and is arranged to control operation of the first, second, third and fourth switchable diffraction gratings in the manner described above.

In particular, the first set of control signals comprises three separate pulse sequences each containing regularly temporally spaced activation pulses (29, 32, 35) of a common width and a common separation (30, 31, 33, 34, 36) which is twice their width. In each such pulse sequence, a pulse is present only when none is present in the other two sequences. For example, a first pulse (29) is present in a first sequence when none is present (31, 34) in the other two concurrent sequences. Then, when the first pulse ends, a subsequent pulse (32) appears in one of the other two sequences, and when this pulse ends (33), a subsequent pulse (35) appears in the third sequence. This ordering of pulses is repeated in successive pulse repetition periods (28) cyclically. The image display screen (20) of the projector unit is responsive to a pulse in each one of the three pulse sequences (23) to display a predetermined image associated with the presence of the given pulse. In this way, three images (e.g. three different colour components (RGB) of a common image) are displayed cyclically.

The second set of control signals (24) comprises an illumination control signal (37) to which the illumination source (21) responds by generating light to illuminate the display panel to produce image-bearing light for input to the waveguide display apparatus (19).

Finally, the third set of control signals (25) is arranged to control operation of the switchable diffraction gratings concurrently. In particular, the third set of control signals comprises two separate pulse sequences each containing regularly temporally spaced activation pulses (38, 42) of a common width and a common separation (40, 41 and 43) which is twice their width. In each such pulse sequence, a pulse is present only when none is present in the other sequence. For example, a first pulse (38) is present in a first sequence when none is present (41) in the other concurrent sequence. Then, when the first pulse ends, no pulse is present in either pulse sequence for a period equal to a pulse width. Subsequently, a pulse (42) appears in the second pulse sequence alone. It is to be noted that a period exists (40, 43) in which no pulse is present in either sequence—this being the case for a duration of time equal to a that of a pulse width. This ordering of pulses is repeated in successive pulse repetition periods (28) cyclically. The first and fourth switchable diffraction gratings are each concurrently driven by the second pulse sequence and are responsive to the presence of the pulse (42) therein to activate and become diffractive, but to remain deactivated otherwise. The second and fourth switchable diffraction gratings are each concurrently driven by the first pulse sequence and are responsive to the presence of the pulse (38) therein to activate and become diffractive, but to remain deactivated otherwise.

The control unit is arranged to generate separate illumination signals for the LED array (21) which cause each one of three colour-dedicated LEDs to illuminate in turn. A first illumination control pulse (61) from the control unit to the LED array causes an LED dedicated to the third wavelength of light ($\lambda_3$) to be illuminated for the duration of the illumination control pulse. A second illumination control pulse (62) from the control unit to the LED array causes an LED dedicated to the first wavelength of light ($\lambda_1$) to be illuminated for the duration of the illumination control pulse. Similarly, a third illumination control pulse (63) from the control unit to the LED array causes an LED dedicated to the second wavelength of light ($\lambda_2$) to be illuminated for the duration of the illumination control pulse. The three colours of light are provided in turn in this way.

Consequently, when a first image is being displayed on the display screen of the projector, the LED array and diffraction gratings are controlled to direct that image for viewing in a first wavelength of light, and when subsequently, a second image is being displayed on the display screen of the projector, the LED array and diffraction gratings are controlled to direct that image for viewing in a second wavelength of light, whereas when the third image is being displayed on the display screen of the projector, the LED array and diffraction gratings are controlled to direct that image for viewing in a third wavelength of light.

Figure 6A:
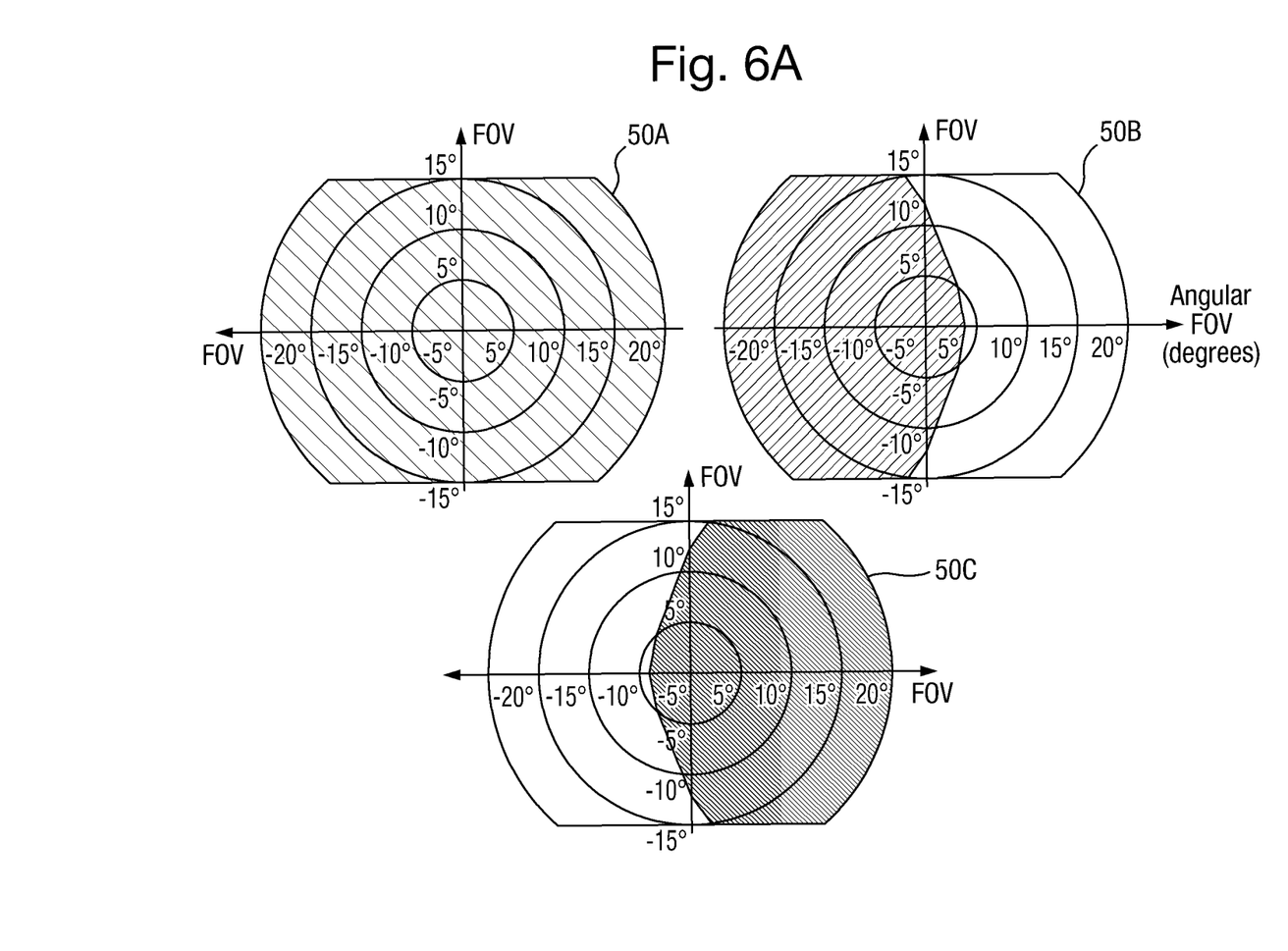
FIGS. 6A and 6B schematically illustrates fields of view achievable according to embodiments of the invention.
Figure 6B:
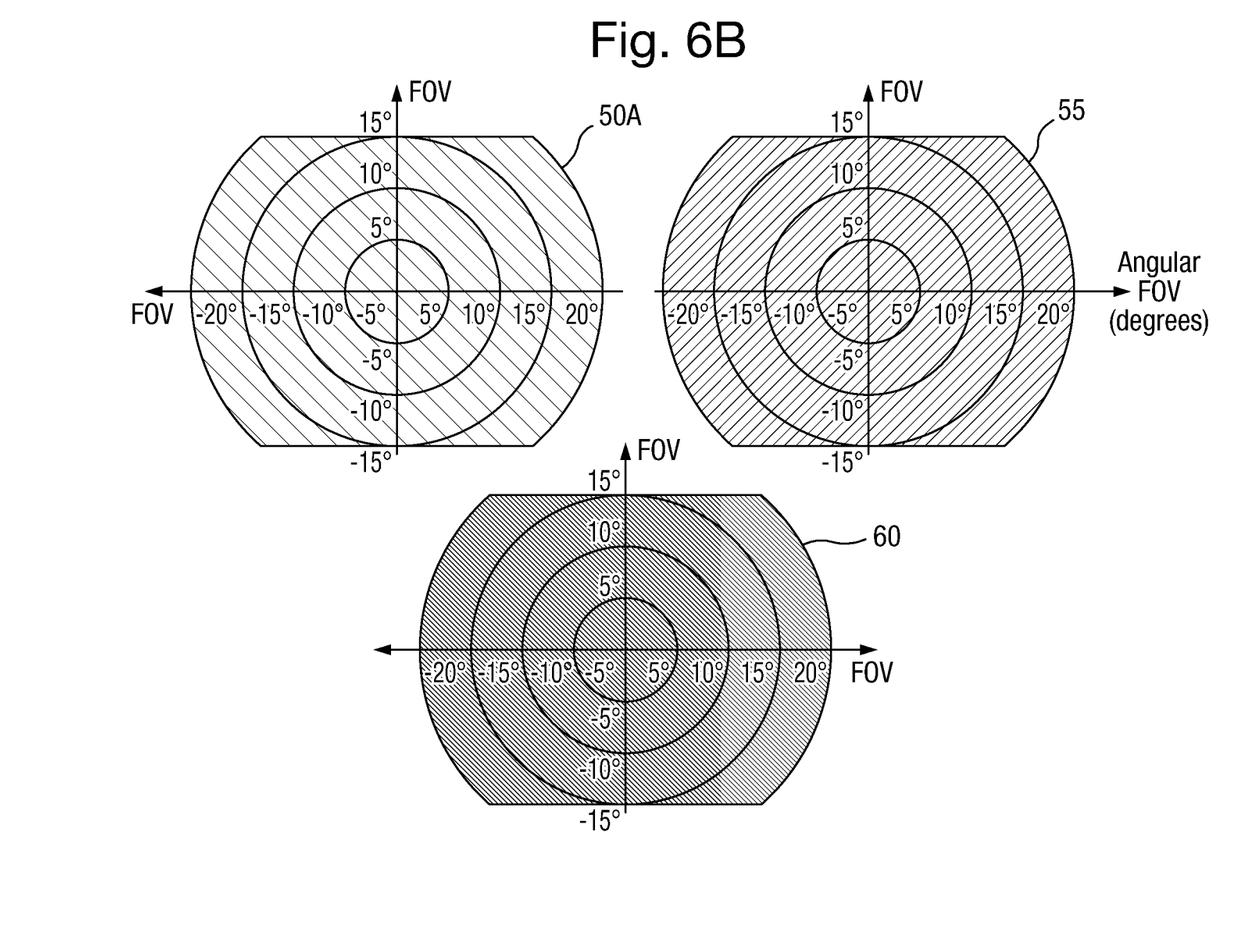

This is repeated cyclically at sufficient speed to appear to the human eye as a continuous display of all three images over the expanded spectrum in full. The result is shown in FIGS. 6A and 6B in which the normal (spectrally unexpanded) angular field of view (range (b)) visible to a user at the output (14, 15, 16) of the apparatus is shown (FIG. 6A). The filed of view in the second (50B) and third (50C) wavelengths of light is incomplete, and less than that of the first (50A) wavelength of light. Also shown (FIG. 6B) is the spectrally expanded field of view visible when the additional two wavelengths of light are fully accessed according to the invention. The field of view in each wavelength of light is the same (50A, 55, 60). In this way, a colour image may be produced comprising three colour components (e.g. RGB), or alternatively a composite image may be produced having picture elements in any one of the three different colours.

It is possible to maximise the spectral expansion within the output field of view (b) by selecting the properties of the switchable diffraction gratings according to the angular field of view of the input grating (2) of the slab waveguide as follows.

Figure 7:
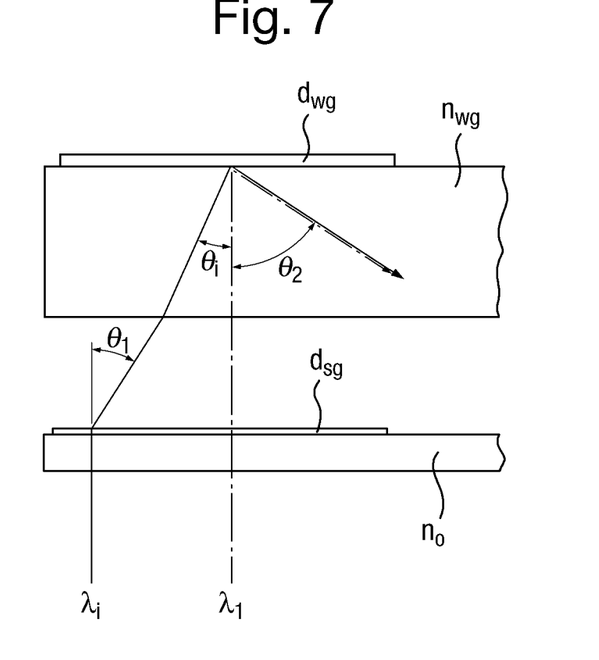
FIG. 7 schematically shows diffraction of rays of light of different wavelengths by a switchable grating and an input grating to achieve total internal reflection within the same total field of view within a waveguide.

In the following derivation, with reference to FIG. 7, the parameters are as follows:

$d_{wg}$=grating constant (pitch) of the waveguide input grating (2);

$n_{wg}$=refractive index of the waveguide (1);

$d_{sg}$=grating constant (pitch) of a switchable grating (10, 11);

$n_0$=refractive index of medium into which light exits from the switchable grating (10, 11);

$\theta_1$=angle of diffraction of light from activated (diffractive) switchable grating (10, 11);

$\theta_i$=angle of incidence of light inside the waveguide glass at the input diffraction grating (2);

$\theta_2$=angle of diffraction from waveguide input diffraction grating (2).

The well-known "Grating Equation" states, for diffraction in to the first order of diffraction:

$$\sin\theta_i + \sin\theta_o = \frac{\lambda}{nd}$$

Where $\theta_i$ is the angle of incidence of light to a diffraction grating, $\theta_o$ is the diffraction angle, n is the refractive index of the medium of propagation, and $\lambda$ the wavelength of light diffracted, and d is the grating constant (pitch) of the diffraction grating.

For a nominal reference wavelength (e.g. green light), and when the switchable grating is non-diffractive (unpowered), we have from the grating equation:

$$\sin\theta_i + \sin\theta_2 = \frac{\lambda_1}{n_{wg}d_{wg}}$$

If $\theta_i$=0 degrees, then:

$$\sin\theta_2 = \frac{\lambda_1}{n_{wg}d_{wg}} \qquad \text{(Equation 1)}$$

For light of other wavelengths ($\lambda_i$), we have from the grating equation:

$$\sin\theta_i + \sin\theta_2 = \frac{\lambda i}{n_{wg}d_{wg}}$$

Substitute of Equation 1 gives:

$$\sin\theta_i = \frac{\lambda_i}{n_{wg}d_{wg}} - \frac{\lambda_1}{n_{wg}d_{wg}} \quad \text{(Equation 2)}$$

Applying Snell's Law between the switchable grating and the waveguide gives:

$n_0 \sin \theta_1 = n_{wg} \sin \theta_i$

Substituting Equation 2 gives:

$$\sin\theta_1 = \frac{n_{wg}}{n_0}\left[\frac{\lambda_i}{n_{wg}d_{wg}} - \frac{\lambda_1}{n_{wg}d_{wg}}\right] \quad \text{(Equation 3)}$$

Thus, one can see that the switchable grating may be such that Equation 3 is satisfied. From the grating equation we have:

$$\sin\theta_1 = \frac{\lambda_i}{n_0 d_{sg}}$$

Substituting Equation 3 gives:

$$\frac{\lambda_i}{n_0 d_{sg}} = \frac{n_{wg}}{n_0}\left[\frac{\lambda_i}{n_{wg}d_{wg}} - \frac{\lambda_1}{n_{wg}d_{wg}}\right]$$

Therefore:

$$d_{sg} = \frac{\lambda_i d_{wg}}{\lambda_i - \lambda_1}$$

This allows the structure (grating constant) of any switchable grating (10, 11, 15, 16) to be determined according to the corresponding structure of the input grating (2), or output grating (14) which is arranged to operate with a wavelengths of light ($\lambda_1$), different to that which the switchable grating is intended to operate ($\lambda_i$).

The embodiments described above are for illustrative purposes and modifications, variants and all equivalents thereto, such as would be readily apparent to the skilled person, are encompassed within the scope of the invention, such as is defined by the claims for example.

The invention claimed is:

1. An apparatus for producing an optical display comprising:
    an optical waveguide;
    a first switchable diffractive part arranged adjacent to an external front surface of an input portion of said optical waveguide, said first switchable diffractive part switchable between a diffractive state for diffracting light of a first wavelength and a non-diffractive state, and arranged to receive light and selectively to diffract the light into said optical waveguide;
    a second diffractive part formed on an external rear surface of said input portion of said optical waveguide, said second diffractive part arranged to receive from the first switchable diffractive part diffracted light of said first wavelength and non-diffracted light of a second wavelength other than the first wavelength and to diffract said light of either wavelength to a common angle for guided propagation along the optical waveguide;
    a third diffractive part formed on said external rear surface of an output portion of said optical waveguide, said third diffractive part optically coupled to the second diffractive part via total internal reflection along the optical waveguide and arranged to receive and to diffract light of said first wavelength from the second diffractive part to a first angle for output from the optical waveguide and to receive and to diffract light of said second wavelength from the second diffractive part to a second angle for output from the optical waveguide; and
    a fourth switchable diffractive part arranged adjacent to said external front surface of said output portion of said optical waveguide, said fourth switchable diffractive part switchable between a diffractive state for diffracting light of the first wavelength and a non-diffractive state, and arranged to receive and selectively to diffract said light from the third diffractive part into a common angle such that light of the first and second wavelengths occupy the same field of view.

2. The apparatus of claim 1 further comprising a fifth switchable diffractive part switchable between a diffractive state for diffracting light of a third wavelength and a non-diffractive state, and arranged to receive light and selectively to diffract the light to the second diffractive part, wherein the second diffractive part is arranged to receive from the first switchable diffractive part diffracted light of said third wavelength and non-diffracted light of said second wavelength other than the third wavelength and to diffract said light of either wavelength to a common angle for guided propagation along the optical waveguide.

3. The apparatus of claim 2, wherein the third diffractive part is arranged to receive and to diffract light of said third wavelength from the second diffractive part to a third angle for output from the optical waveguide and to receive and to diffract light of said second wavelength from the second diffractive pan to said second angle for output from the optical waveguide, the apparatus including and a sixth switchable diffractive part switchable between a diffractive state for diffracting light of the third wavelength and a non-diffractive state, and arranged to receive light and selectively to diffract the light from the third diffractive part into a common angle such that light of the second and third wavelengths occupy the same field of view.

4. The apparatus of claim 1 in which at least one of said switchable diffractive parts is formed within or upon an optical substrate separate from said optical waveguide.

5. The apparatus of claim 1 in which at least one of said switchable diffractive parts is formed within or upon said optical waveguide.

6. The apparatus of claim 2, wherein the first switchable diffractive part at least partially overlaps the fifth switchable diffractive part.

7. The apparatus of claim 3, wherein the fourth switchable diffractive part at least partially overlaps the sixth switchable diffractive part.

8. The apparatus of claim 1, further comprising a control unit arranged to control the first switchable diffractive part and the fourth diffractive part selectively to adopt the same one of said diffractive state and a non-diffractive state concurrently.

9. The apparatus of claim 3, further comprising a control unit arranged to control the fifth switchable diffractive part and the sixth diffractive part selectively to adopt the same one of said diffractive state and a non-diffractive state concurrently.

10. The apparatus of claim 9, wherein the control unit is arranged to control the fifth switchable diffractive part and the sixth switchable diffractive part selectively to each adopt concurrently the same one of said diffractive state and a non-diffractive state and to control concurrently the first switchable diffractive part and the fourth switchable diffractive part selectively to each adopt concurrently the same other one of said diffractive state and a non-diffractive state.

11. The apparatus of claim 8, wherein the control unit is arranged to alternately switch said switchable diffractive parts between said diffractive state and a non-diffractive state cyclically.

12. The apparatus of claim 11, wherein the control unit is arranged to switch said switchable diffractive parts cyclically including a condition such that all adopt a non-diffractive state concurrently.

13. The apparatus of claim 2, further comprising a light source arranged to generate light according to said first, second and third wavelengths.

14. The apparatus of claim 2, wherein said switchable diffractive part is switchable to comprise a diffraction grating with a grating constant of a switchable grating ($d_{sg}$) arranged to diffract said light of the first (or third) wavelength ($\lambda_i$, i=1, 3) received thereby into the angular field of view of the second diffractive part, or within the angular field of view of the second diffractive part, in respect of light of the second wavelength ($\lambda_2$) wherein the second diffractive part has a grating constant of a waveguide input grating ($d_{wg}$), and:

$$d_{sg} = \frac{\lambda_i d_{wg}}{\lambda_i - \lambda_2}.$$

15. A method for producing an optical display comprising:
providing an optical waveguide;
providing a first switchable diffractive part arranged adjacent to an external front surface of an input portion of said optical waveguide, said first switchable diffractive part switchable between a diffractive state for diffracting light of a first wavelength and a non-diffractive state, and receiving light and selectively diffracting the light to said optical waveguide;
at a second diffractive part formed on an external rear surface of said input portion of said optical waveguide, receiving from the first switchable diffractive part diffracted light of said first wavelength and non-diffracted light of a second wavelength other than the first wavelength and diffracting said light of either wavelength to a common angle for guided propagation along the optical waveguide;
providing a third diffractive part arranged adjacent to said external front surface of said output portion of said optical waveguide, said third diffractive part optically coupled to the second diffractive part via total internal reflection along the optical waveguide and therewith receiving and diffracting light of said first wavelength from the second diffractive part to a first angle for output from the optical waveguide and receiving and diffracting light of said second wavelength from the second diffractive part to a second angle for output from the optical waveguide; and
providing a fourth switchable diffractive part arranged adjacent to said external front surface of said output portion of said optical waveguide, said fourth diffractive part switchable between a diffractive state for diffracting, light of the first wavelength and a non-diffractive state, and therewith receiving and selectively diffracting said light from the third diffractive part into a common angle such that light of the first and second wavelengths occupy the same field of view.

16. The apparatus of claim 1, wherein the first switchable diffractive part includes a first switchable diffraction grating fully overlapping and in register with a second switchable diffraction grating.

17. The apparatus of claim 16, wherein the first switchable diffraction grating is a same size as the second switchable diffraction grating.

* * * * *

UNITED STATES PATENT AND TRADEMARK OFFICE
CERTIFICATE OF CORRECTION

PATENT NO. : 9,664,824 B2  
APPLICATION NO. : 14/650682  
DATED : May 30, 2017  
INVENTOR(S) : Michael David Simmonds and Mohmed Salim Valera Page 1 of 1

It is certified that error appears in the above-identified patent and that said Letters Patent is hereby corrected as shown below:

In the Claims

In Column 14, Line 41, replace "diffractive pan to said second angle for output from the" with -- diffractive part to said second angle for output from the --

Signed and Sealed this
Seventeenth Day of October, 2017

Joseph Matal
*Performing the Functions and Duties of the*
*Under Secretary of Commerce for Intellectual Property and*
*Director of the United States Patent and Trademark Office*